L. STEBBINS.
Coloring Maps.
BEST AVAILABLE COPY
No. 32.
Improvement Patent 1510
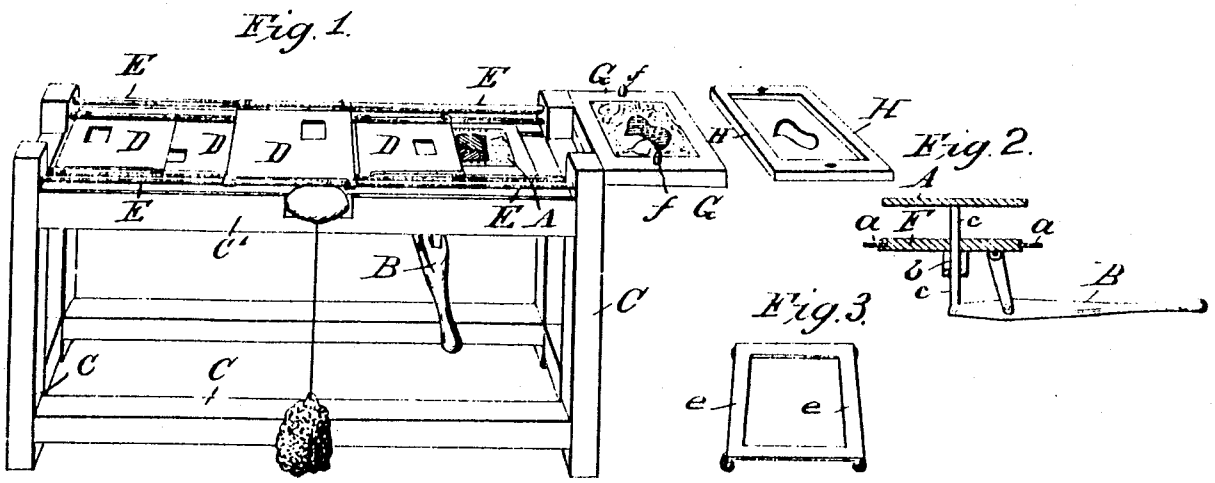
A. I. Patented Sept. 5, 1840.